United States Patent [19]

Pasqualini

[11] Patent Number: 4,718,960

[45] Date of Patent: Jan. 12, 1988

[54] METHOD FOR PRODUCING RIGID PLASTIC FRAMES

[75] Inventor: Bruno Pasqualini, Varese, Italy

[73] Assignee: Pantasote Inc., Greenwich, Conn.

[21] Appl. No.: 822,463

[22] Filed: Jan. 27, 1986

[51] Int. Cl.⁴ ............... B29C 49/00; B31F 1/00; B25G 3/34; F16B 11/00

[52] U.S. Cl. ............... 156/198; 156/221; 264/267; 264/296; 264/320; 403/265

[58] Field of Search ............... 156/221, 228, 196, 227, 156/223, 198, 304.1, 306.6; 264/295, 296, 322, 340, 267, 320, 239, 164, 504; 52/259, 631; 144/381; 493/406, 334, 380; 403/265, 270, 279

[56] References Cited

U.S. PATENT DOCUMENTS

| | | | |
|---|---|---|---|
| 1,881,734 | 10/1932 | Lewis | 52/631 |
| 2,381,134 | 8/1945 | Newmark | 156/221 |
| 2,392,734 | 1/1946 | Haberstump | 156/228 |
| 4,086,315 | 4/1978 | Piotrowski | 264/296 |
| 4,279,853 | 7/1981 | Ohta et al. | 264/322 |
| 4,428,782 | 1/1984 | Kurita et al. | 156/228 |
| 4,595,551 | 6/1986 | Maurer | 264/322 |

Primary Examiner—Donald E. Czaja
Assistant Examiner—Louis Falasco
Attorney, Agent, or Firm—Jacobs & Jacobs

[57] ABSTRACT

A method for the production of frames from rigid plastic profiles for use on refrigerator cabinets and in particular on chest freezers, which comprises forming the plastic profiles, mitering and welding the edges of the plastic profiles to form a frame having sharp-edged corners, and rounding at least one of the sharp-edged corners by means of thermo-forming.

The invention also comprises the finished frame thereby obtained and its application in the field of refrigerator cabinets and in particular, chest freezers.

3 Claims, 8 Drawing Figures

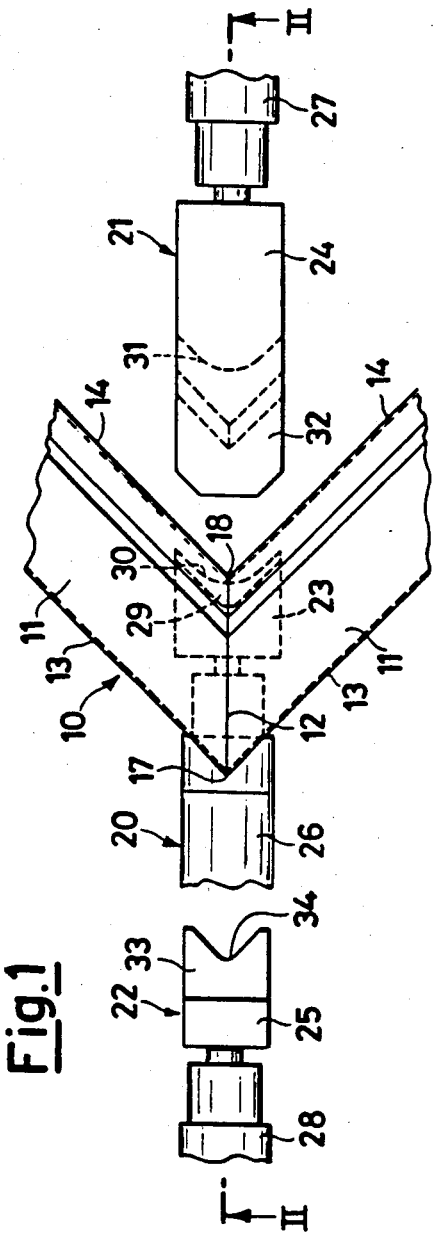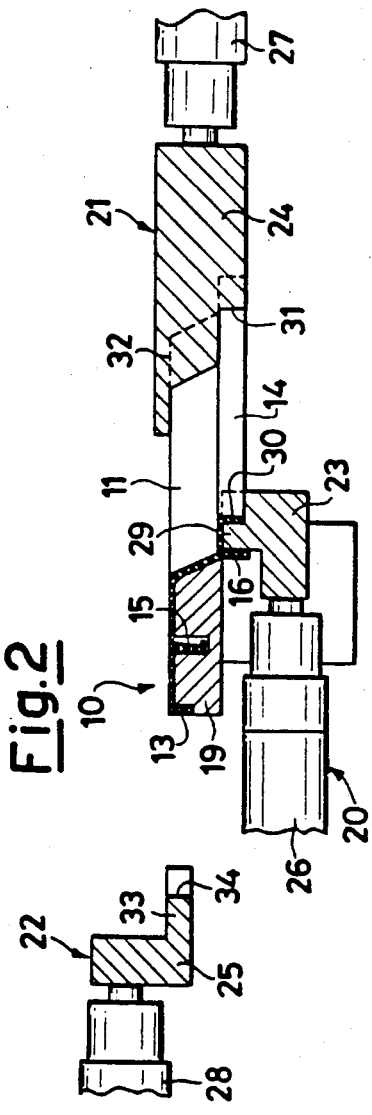

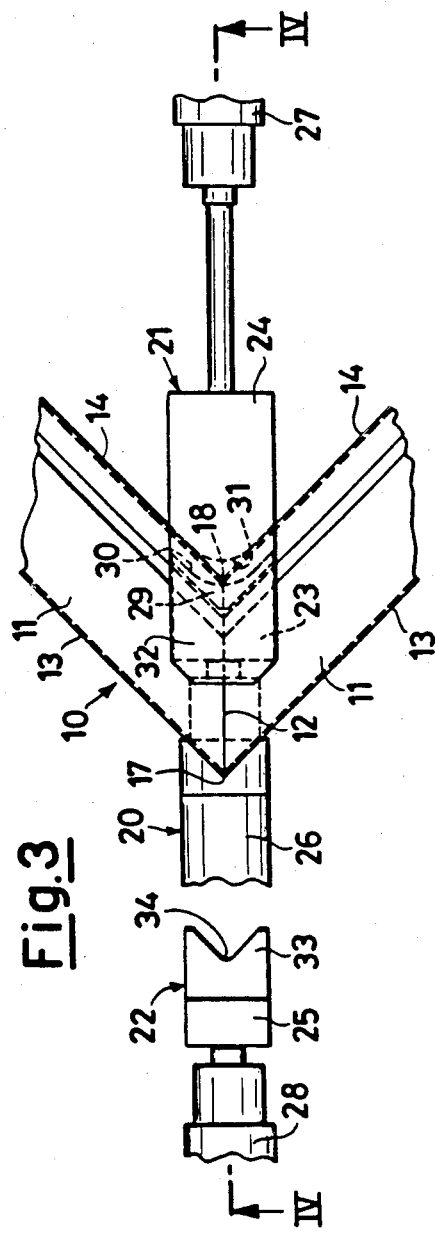
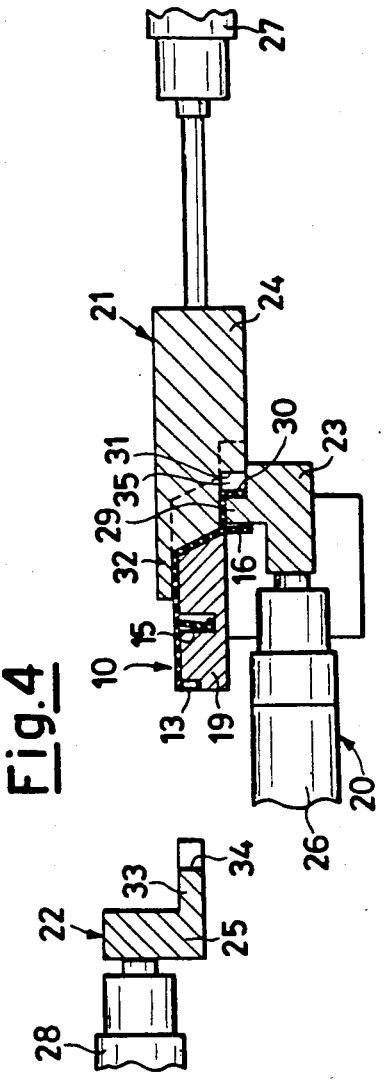

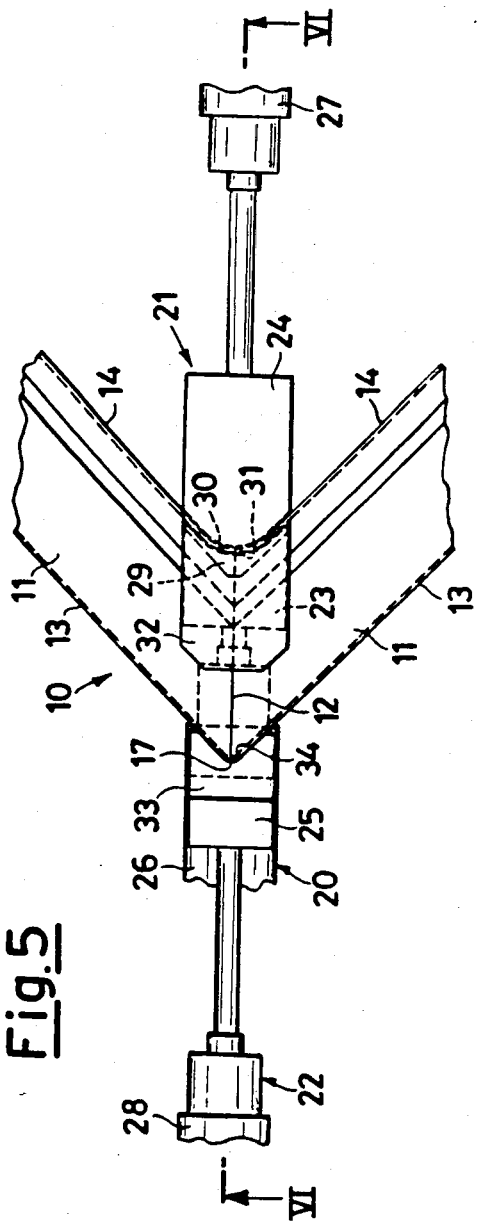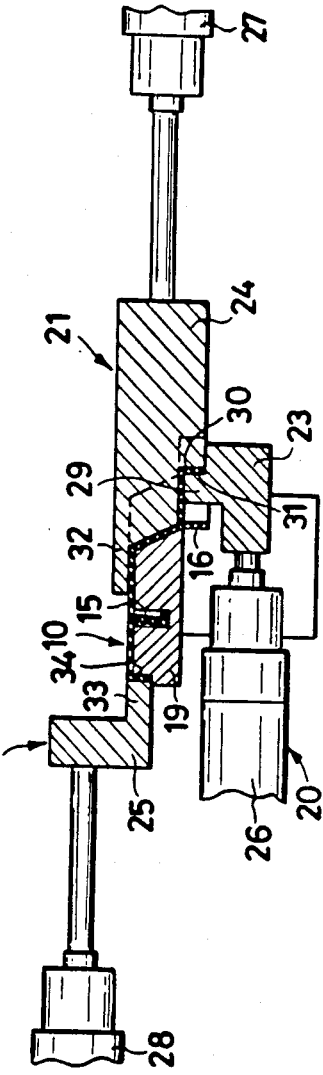

METHOD FOR PRODUCING RIGID PLASTIC FRAMES

The present invention relates to the production of plastic frames for cabinets, and particularly to frames for refrigerator or freezer cabinets.

Frames for cabinets, such as refrigerator or freezer cabinets, have previously been prepared by welding metal or plastic profiles to form the frame. In particular, extruded segments of rigid plastic profiles have been welded end-to-end to form frames for refrigerator or freezer cabinets. These prior art plastic profiles have the disadvantage, however, of leaving the finished frame with sharp and hence unsafe corners.

Frames with sharp corners also present problems in the manufacture of refrigerators and freezers, particularly chest freezers that open from the top. It is known that chest freezers have walls made of parallel internal and external wall parts that define a cavity into which the cooling ducts or tubing are placed. However, the cooling ducts or tubing must be placed as closely as possible to the internal wall parts to obtain the highest thermal efficiency, but it is difficult to do so at the corners, because the curved ducts or tubing will be widely spaced from the internal wall at each corner. This results in a loss of thermal efficiency at the corners.

A frame having sharp corners also presents problems when it is desired to use an internal wall furnished with a "roll-bond", which as is known, is obtained from two sheets of aluminum adhesively attached together. The "roll-bond" is furnished on all four reaches of the internal wall and must have a curved radius such that the channels for the cooling liquid are not closed off inside the "roll-bond". The presence of sharp corners would thus interfere with the "roll-bond".

The present invention now provides a method for the production of frames having rounded corners from rigid plastic profiles for use in refrigerator cabinets and in particular chest freezers, which comprises the steps of forming the plastic profiles, mitering and welding the ends of the plastic profiles to form a frame having sharp-edged corners, and rounding at least one of the sharp-edged corners by means of thermo-forming. The present invention also provides the finished frame thereby obtained.

The present invention is illustrated in terms of the accompanying drawings, in which:

FIG. 1 is a plan view of a portion of a frame having sharp-edged corners, with the thermo-forming equipment in its starting position;

FIG. 2 is a view in section taken along lines II—II of FIG. 1;

FIG. 3 is a view similar to FIG. 1, showing the first thermo-forming stage;

FIG. 4 is a view in section taken along lines IV—IV of FIG. 3;

FIG. 5 is a view similar to FIG. 1 showing the final thermo-forming stage;

FIG. 6 is a view in section taken along lines VI—VI of FIG. 5;

Figure 7:
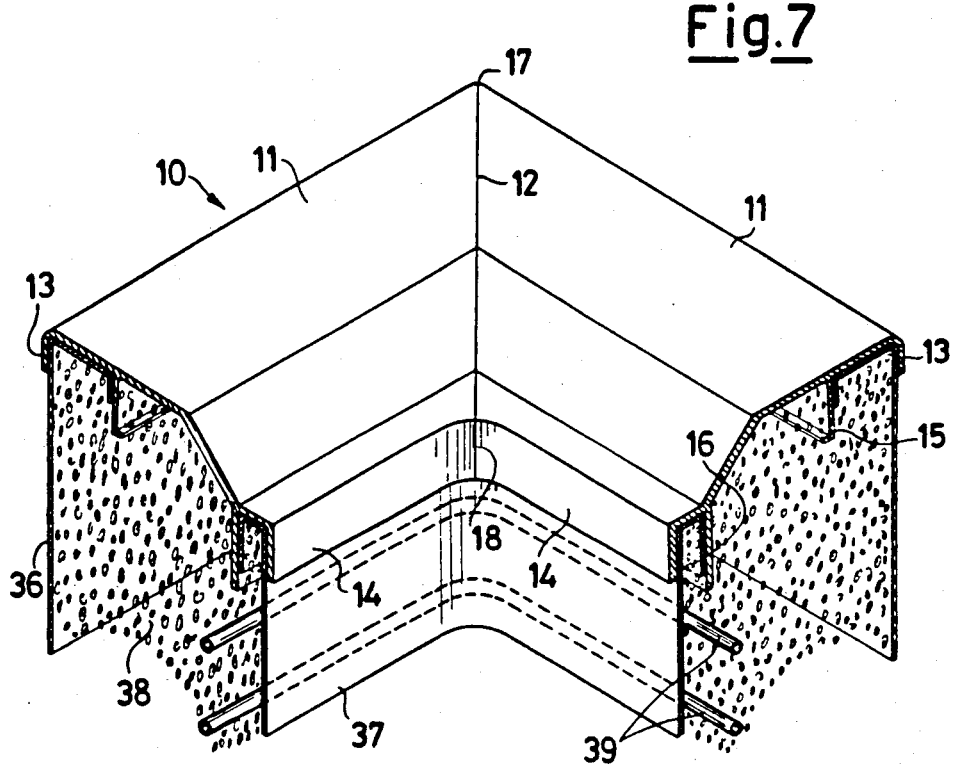
FIG. 7 is a perspective view, partly in section of the frame of the invention assembled on a chest freezer.

Referring to FIG. 1, frame 10 is comprised of four extruded, rigid plastic profile segments 11, which have been mitered to form edges 12 that are heat-welded together to form four 90° sharp corners, one of which being shown in FIG. 1. The production of the profiles 11 and the mitering and welding operations are well known in the art.

The cross-section of frame 10 is substantially saw-shaped and comprises side parts 13 and 14, which delimit frame 10, internally and externally, and vertical ribs 15 and 16. The junctions of edges 12 of each pair of lengths of profiles 11 thus provide a sharp-edged outer corner 17 corresponding to the welding of a pair of parts 13, and a sharp-edged inner corner 18 corresponding to the welding of a pair of parts 14.

Each corner 17, 18 of frame 10 is positioned as shown in FIGS. 1 and 2 relative to a thermo-forming unit comprising a countermold 19, which acts as a fixed support for the frame 10, and a mold comprising several forming tools, for example three forming members 20, 21, and 22 each comprising a piston 23, 24 and 25, respectively, connected to a cylinder 26, 27 and 28, respectively. Each piston 23, 24, 25 is furnished with a head substantially complementary to the shape of the part of the frame 10 with which said head will move into contact, with the exceptions later described hereunder. In particular, the piston 23 is furnished with a substantially asymetric T-shaped head 29.

FIGS. 1 and 2 show the molds in their starting position. The head of the piston 23 is inserted under the corner 17 of the frame 10 between the vertical rib 16 and the external part 14. The surface 30 of the head 29, which is in contact with the inner corner 18 of the frame 10, has a curved configuration that is complementary to the configuration of the surface 31 of head 32 of piston 24. The surfaces 30 and 31, relative to the inner corner 18, have a concave and a convex configuration, respectively. The thermo-forming unit is furnished with suitable elements (not shown) for heating the frame, which can be located in the countermold 19 or the mold or both. The heating elements can be radiation heating elements or other suitable heaters.

The thermo-forming operation proceeds from the starting position as shown in FIGS. 1 and 2 to the first stage schematically shown in FIGS. 3 and 4 whereby, while the forming members 20 and 22 remain in their starting position, the piston 24 of forming member 21 moves into contact with the corner 18 of the frame 10 facing said members. The piston 24 reaches its stroke-limit while maintaining an air space 35 (FIG. 4) between the piston head and frame 10. FIGS. 5 and 6 show the final stage of the thermo-forming operation, whereby the forming members 22 and 20, with their respective pistons 25 and 23, move into contact with the corresponding parts of the frame 10 facing said members. In particular, the head 29 of the piston 23 pushes corner 18 against the surface 31 of the head of the piston 34, said corner being thermo-formable due to the heat applied. Owing to the complementary concave and convex configuration of the surfaces 30 and 31, respectively, the corner 18 assumes the corresponding rounded final configuration shown in FIGS. 6 and 7, with the air space 35 consequently being filled. At the same time, by means of the pushing action of piston 25, the outer corner 17 of frame 10 is rounded against the curved configuration of the surface 34 of head 33 of piston 25.

Figure 8:
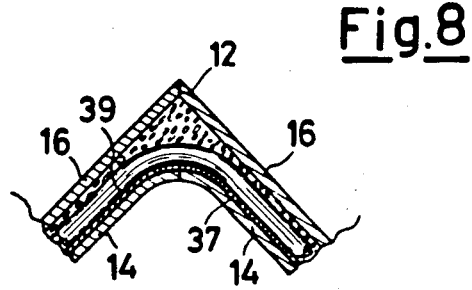
FIG. 8 is a detail view, in section, of a portion of the frame shown in FIG. 7.

FIG. 7 shows the final configuration of the finished frame 10 in which the corners 17 and 18 are rounded. Frame 10 thus obtained may be assembled on a chest freezer with metallic external wall 36 and internal wall 37. The cavity thereby obtained is filled with an insulating material 38 surrounding the coiled ducts 39 containing cooling fluid, the ducts being in parallel relationship to and adjacent the internal wall 37. As clearly seen in FIG. 8, the internal wall 37 is fitted between the vertical rib 16 and the part 14 of the frame 10 and can follow the curved configuration of the frame, thereby enabling the coiled cooling ducts on the tubing 39 containing the cooling liquid or the "roll-bond" (not shown) to be as close as possible to the internal wall 37 of the freezer chamber, thus improving the thermal performance of said freezer.

Another important advantage of the present invention is that the finished frame 10 thereby obtained has no sharp-edged corners, thereby avoiding the dangers such corners present.

I claim:

1. In a method for the production of frames having rigid profiles of plastic material for use in regrigerator cabinets and particularly chest freezers, wherein said plastic profiles are mitered and welded at their ends to form a frame having sharp-edged welded corners, said profiles having an elongated base portion and a side wall depending from one edge of said base portion and providing the inner wall of said welded corners of said frame, the improvement which comprises rounding said inner wall of at least one of said sharp-edged welded corners of said frame by means of thermo-forming.

2. The method according to claim 1, wherein said frame is supported on a countermold and the inner wall of said sharp-edged welded corner is rounded using one or more forming tools while said welded corner of said frame is heated.

3. The method according to claim 1, wherein four said mitered profiles are welded together to form a frame having four 90° sharp-edged welded corners, and then the inner wall of each of said sharp-edged welded corners of said frame is rounded by means of thermo-forming.

* * * * *